United States Patent
Yoo et al.

(10) Patent No.: US 12,216,027 B2
(45) Date of Patent: Feb. 4, 2025

(54) WIRE ROPE DIAGNOSTIC DEVICE THAT CAN BE ENGAGED USING BATTERY PACKS

(71) Applicant: NKIA CO., LTD., Seongnam-si (KR)

(72) Inventors: Sung Soo Yoo, Anyang-si (KR); In Hwan Lee, Seongnam-si (KR); Ki Hoon Shin, Anyang-si (KR); Eun Min Yoo, Yongin-si (KR); Jung Hwan Son, Seoul (KR)

(73) Assignee: NKIA CO., LTD., Seongnam-si (KR)

( * ) Notice: Subject to any disclaimer, the term of this patent is extended or adjusted under 35 U.S.C. 154(b) by 351 days.

(21) Appl. No.: 17/773,847

(22) PCT Filed: Aug. 10, 2021

(86) PCT No.: PCT/KR2021/010587
§ 371 (c)(1),
(2) Date: May 3, 2022

(87) PCT Pub. No.: WO2022/039434
PCT Pub. Date: Feb. 24, 2022

(65) Prior Publication Data
US 2022/0381641 A1 Dec. 1, 2022

(30) Foreign Application Priority Data
Aug. 19, 2020 (KR) .................. 10-2020-0103904

(51) Int. Cl.
*G01M 5/00* (2006.01)
*B66C 13/10* (2006.01)

(52) U.S. Cl.
CPC ......... *G01M 5/0025* (2013.01); *B66C 13/105* (2013.01)

(58) Field of Classification Search
CPC ............ G01M 5/0025; G01M 5/0033; G01M 5/0091; G01M 5/0041; B66C 13/105;
(Continued)

(56) References Cited

U.S. PATENT DOCUMENTS

| 8,164,329 B2 * | 4/2012 | Yoshioka | G01N 27/83 324/238 |
| 8,536,861 B2 * | 9/2013 | Furusawa | G01N 27/83 324/241 |

(Continued)

FOREIGN PATENT DOCUMENTS

| JP | 2017-166885 A | 9/2017 |
| JP | 2019-015656 A | 1/2019 |

(Continued)

OTHER PUBLICATIONS

International Search Report for PCT/KR2021/010587 mailed Nov. 25, 2021 from Korean Intellectual Property Office.

*Primary Examiner* — Freddie Kirkland, III
(74) *Attorney, Agent, or Firm* — Revolution IP, PLLC

(57) ABSTRACT

The present invention relates to a wire rope diagnostic device that is capable of being fastened or unfastened by means of battery packs, and more specifically, to a wire rope diagnostic device for performing safety diagnosis of a wire rope used for a lifting device such as a crane, an elevator, a water gate, and the like in real time that is capable of being fixedly fastened by means of battery packs so that it can be simply installed and separated and allow the battery packs to be easily exchanged.

11 Claims, 9 Drawing Sheets

(58) Field of Classification Search
CPC ........ B66C 15/00; H02J 7/0045; Y02E 60/10; G01N 27/83; G01N 27/80; G01N 27/82
See application file for complete search history.

(56) References Cited

U.S. PATENT DOCUMENTS

| | | | |
|---|---|---|---|
| 9,075,023 B2* | 7/2015 | Yoshioka | G01N 27/83 |
| 10,222,351 B2* | 3/2019 | Kondoh | G01N 27/82 |
| 10,571,429 B2* | 2/2020 | Terai | G01N 27/83 |
| 10,578,582 B2* | 3/2020 | Omi | B66C 13/16 |
| 10,724,992 B2* | 7/2020 | Hirota | G01N 27/82 |
| 11,117,785 B2* | 9/2021 | Hirota | B66D 1/54 |
| 11,199,592 B2* | 12/2021 | Seavey | G01N 27/87 |
| 11,796,506 B2* | 10/2023 | Seavey | G01N 27/82 |
| 2007/0188165 A1* | 8/2007 | Kitanaka | G01D 5/145 |
| | | | 324/207.25 |
| 2015/0130454 A1* | 5/2015 | Itoi | G01N 27/83 |
| | | | 324/240 |
| 2016/0329615 A1* | 11/2016 | Bergmann | H01M 50/103 |
| 2018/0202972 A1* | 7/2018 | Omi | B66B 7/123 |
| 2020/0256832 A1* | 8/2020 | Seavey | G01N 27/87 |
| 2021/0234225 A1* | 7/2021 | Takeda | H01M 50/258 |
| 2022/0260529 A1* | 8/2022 | Seavey | G01N 27/87 |

FOREIGN PATENT DOCUMENTS

| | | |
|---|---|---|
| KR | 10-0456638 B1 | 11/2004 |
| KR | 10-2008-0001578 A | 1/2008 |
| KR | 10-2009-0037285 A | 4/2009 |

* cited by examiner

[Fig. 1]
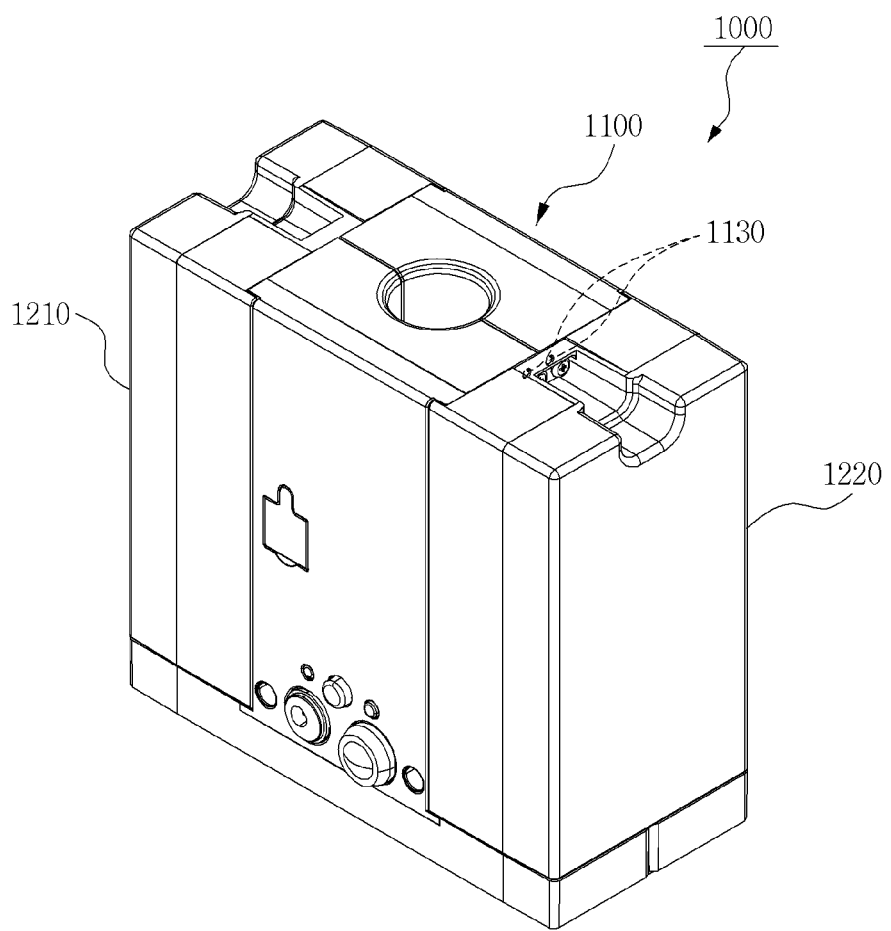

【Fig. 2】
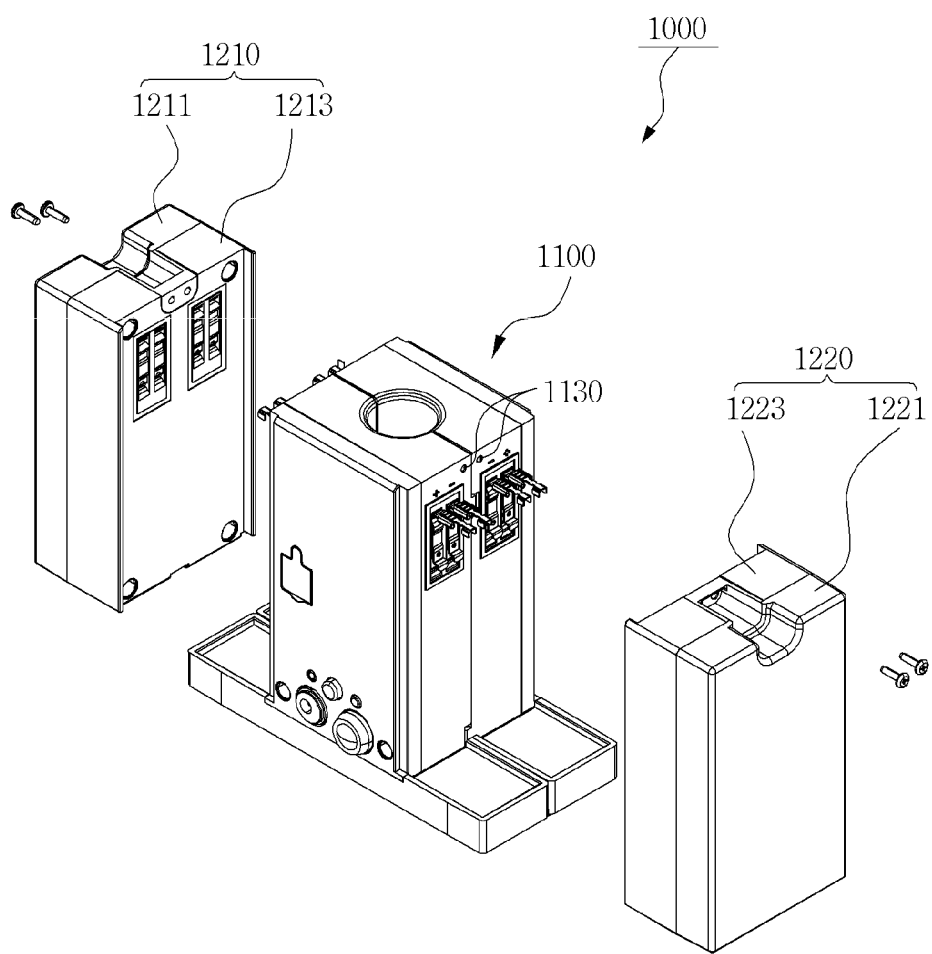

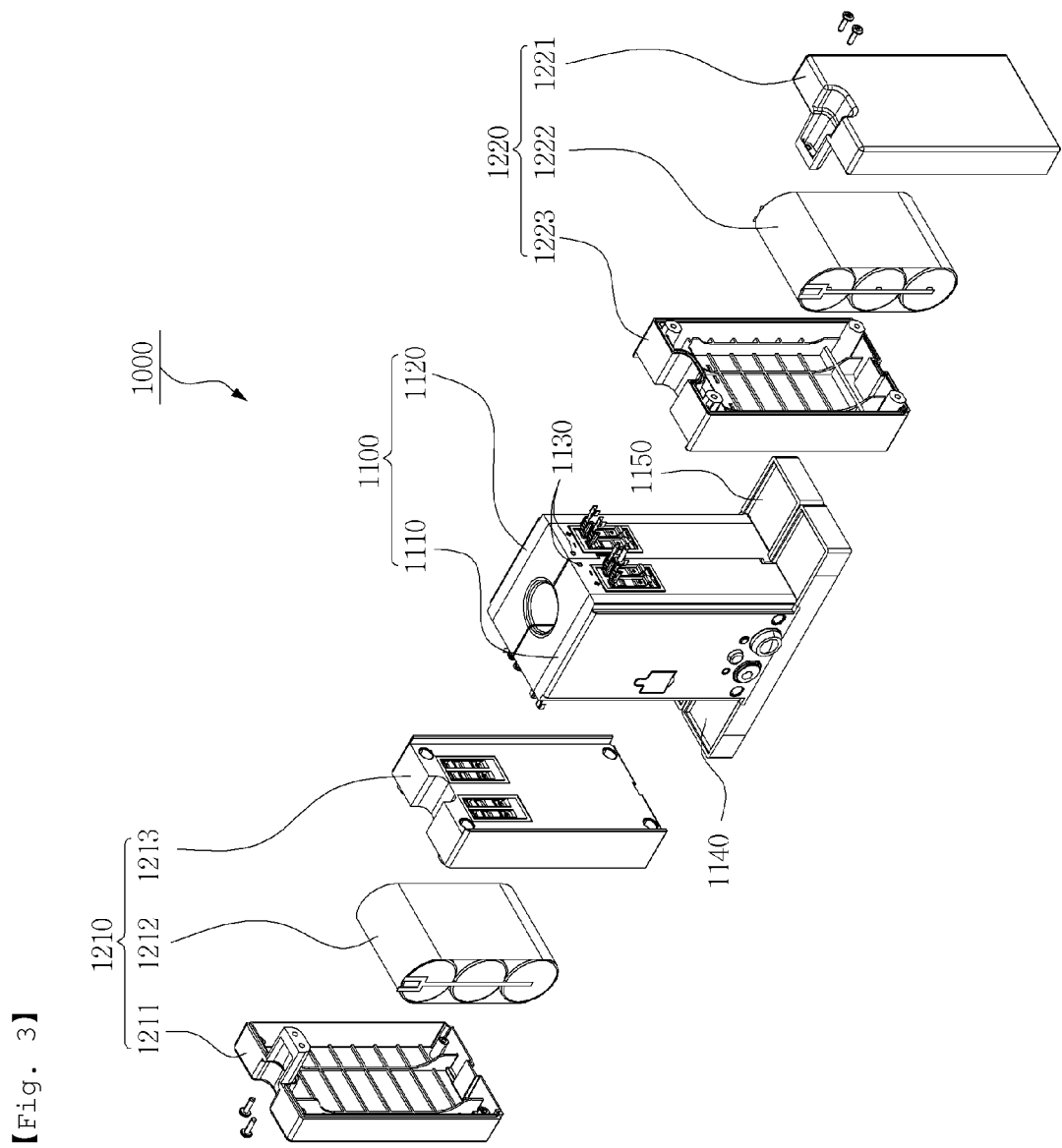
[Fig. 3]

[Fig. 4]
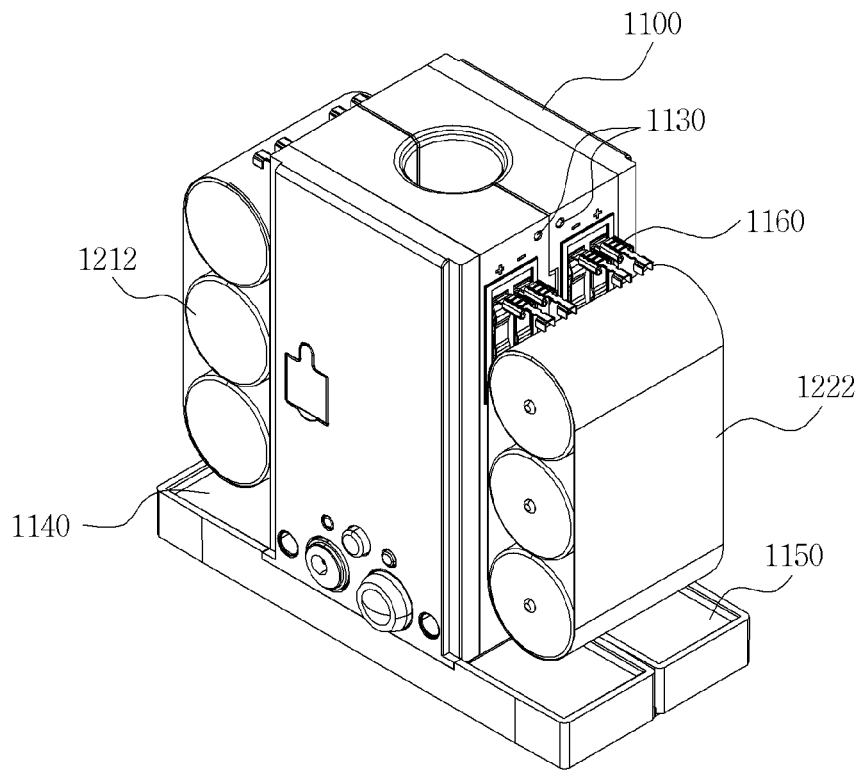
[Fig. 5]
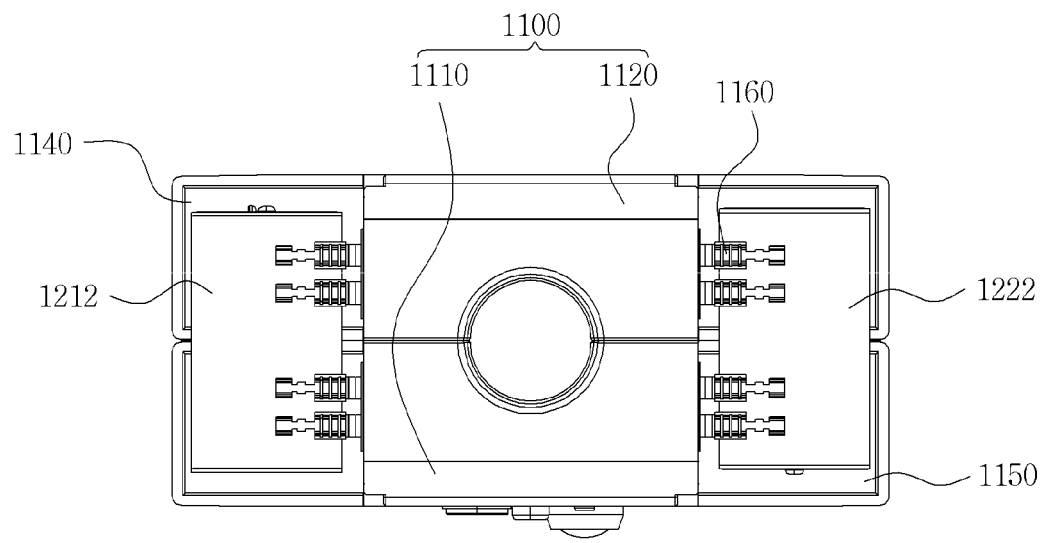

[Fig. 6]
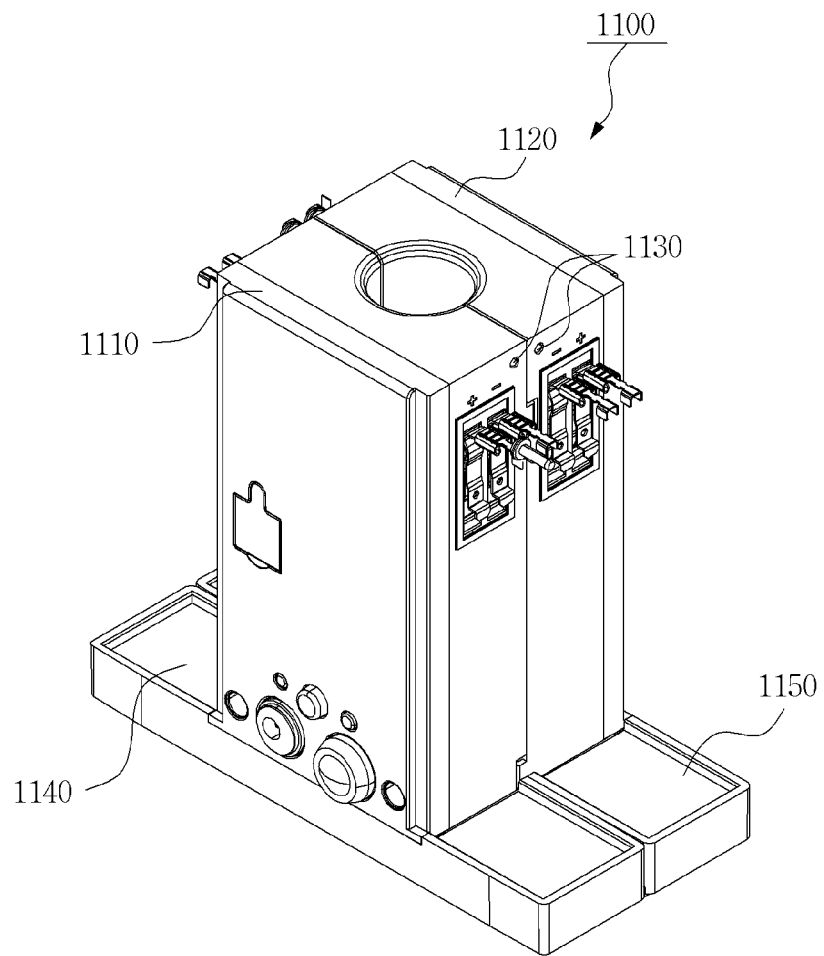

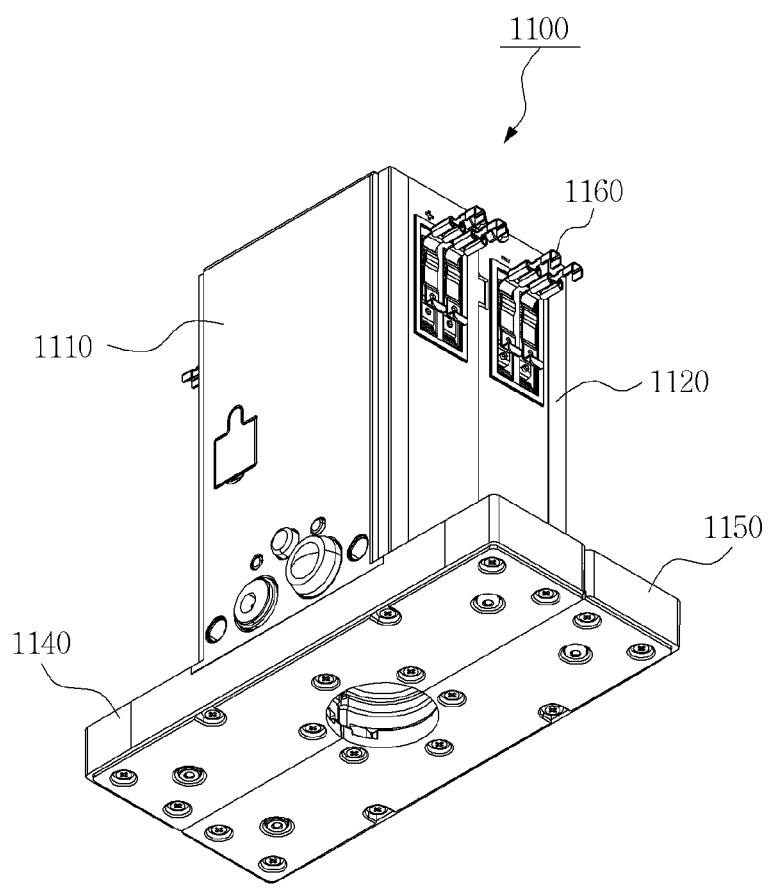
[Fig. 7]

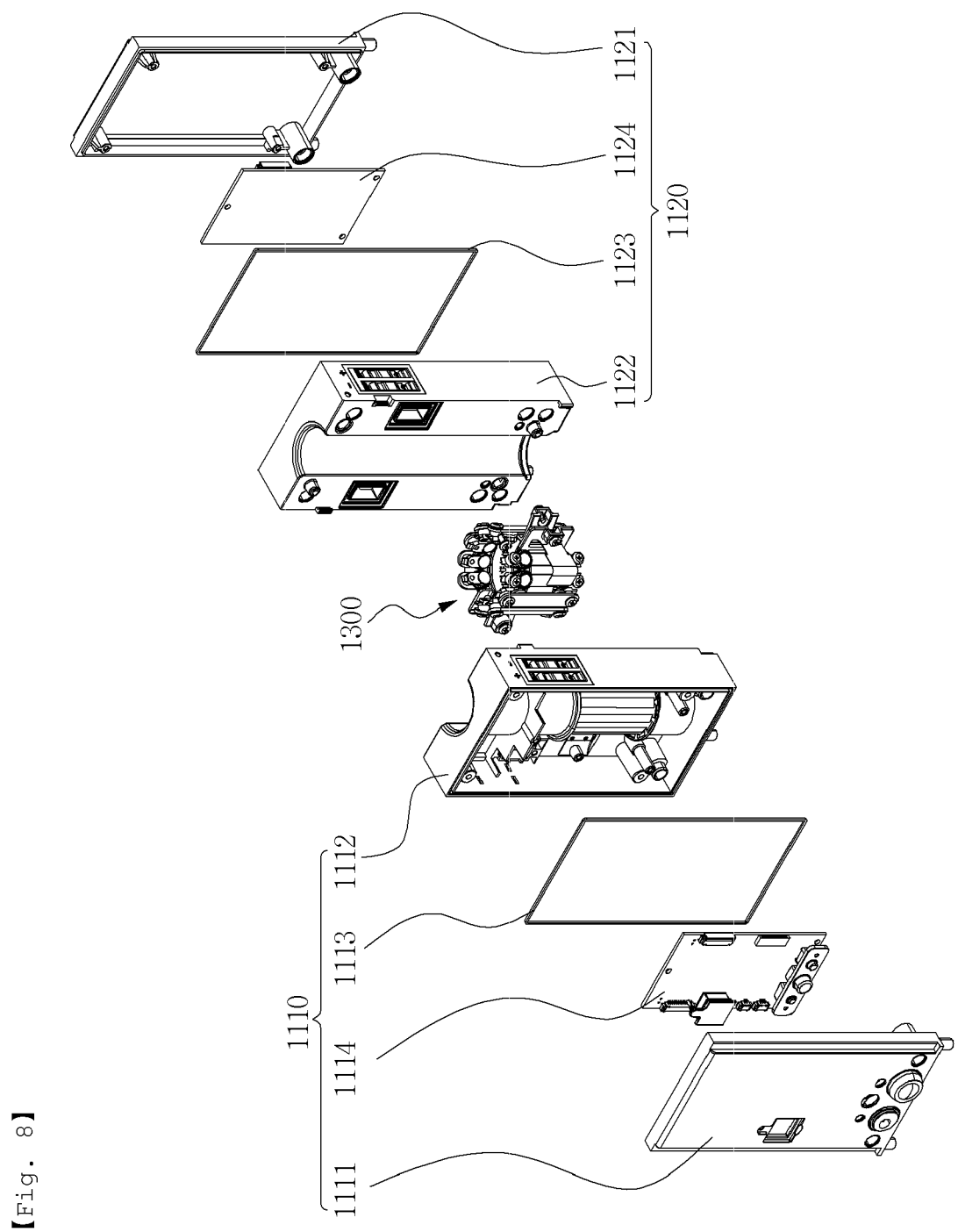
[Fig. 8]

【Fig. 9】
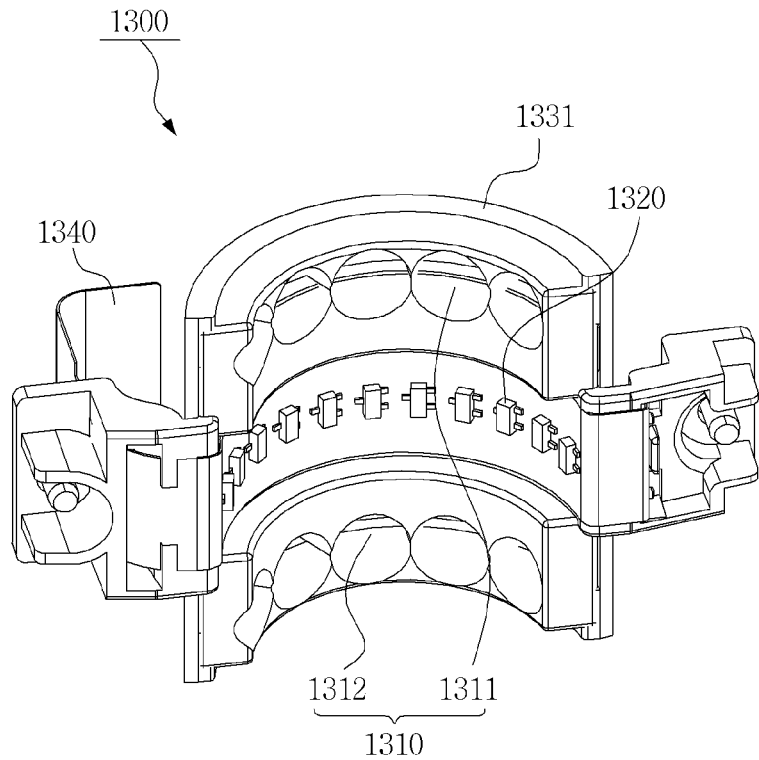
【Fig. 10】
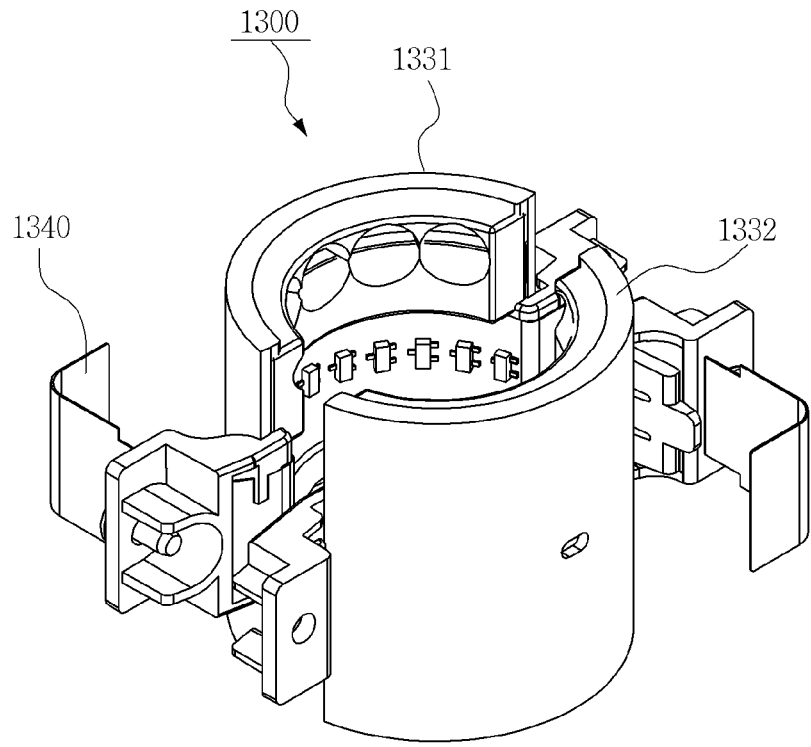

【Fig. 11】
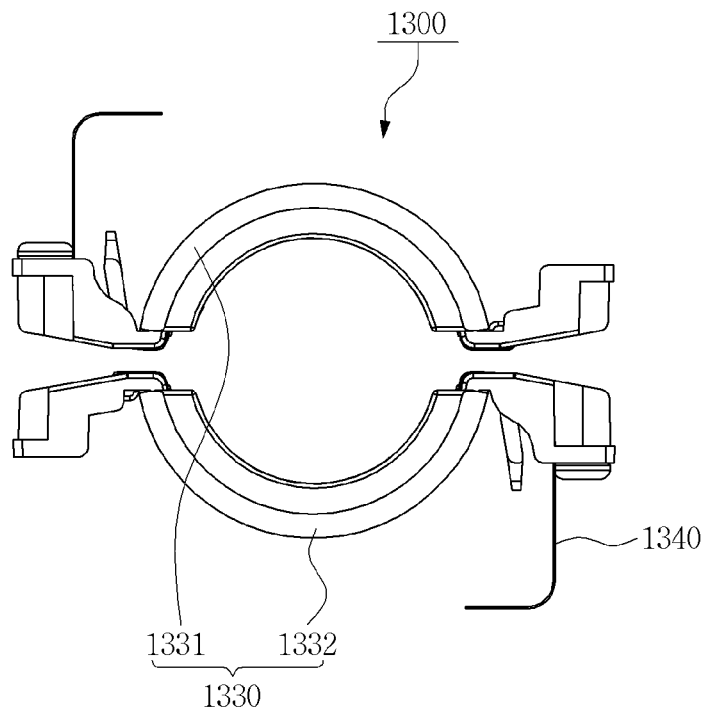
【Fig. 12】
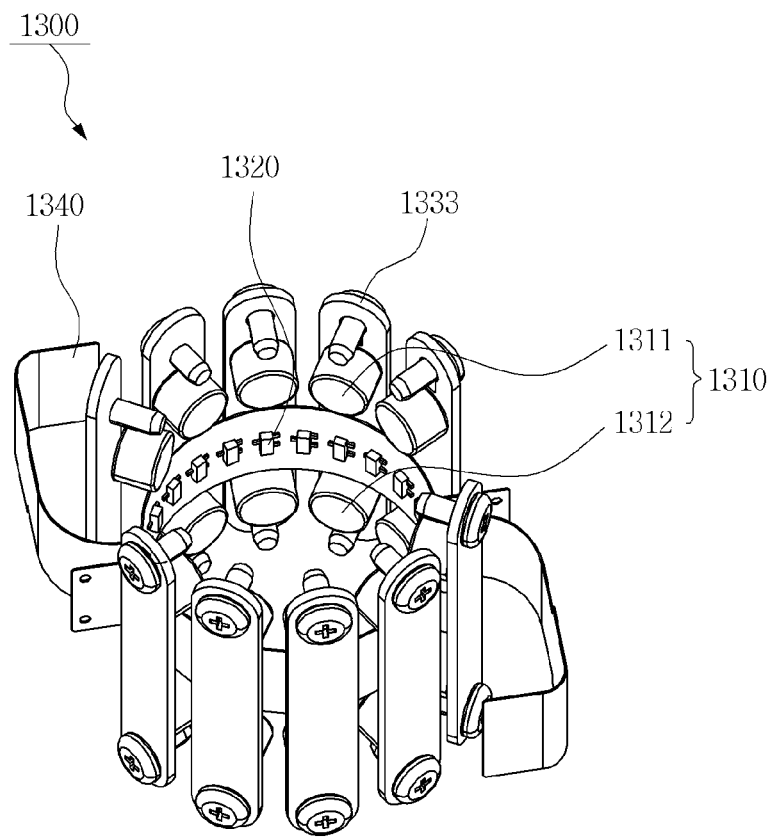

WIRE ROPE DIAGNOSTIC DEVICE THAT CAN BE ENGAGED USING BATTERY PACKS

TECHNICAL FIELD

The present invention relates to a wire rope diagnostic device that is capable of being easily fastened or unfastened by means of battery packs, and more specifically, to a wire rope diagnostic device that is capable of being modularized and separated or fastened by means of battery packs to thus perform safety diagnosis of a wire rope used for a lifting device for lifting loads.

BACKGROUND ART

A wire rope is made by twisting strands of good quality of carbon steel wires and winding the strands around a core to a constant pitch, which is generally used for lifting devices such as a crane, an elevator, and the like.

Since the wire rope is used to support and lift heavy loads, accordingly, safety management of the wire rope is very important. If the wire rope is damaged or broken, big safety accidents may happen, and accordingly, a device for performing wire rope diagnosis is definitely needed.

In existing wire rope diagnosis, manual checks such as dimension measurement, dangerous state determination by naked eye, and the like are performed, which cause a safety diagnosis worker to be exposed to dangers or generate false positive from the worker's individual experiences. As a result, the corresponding work is stopped and an excessive cost is consumed. Further, facilities may be destroyed, and work-related injuries and deaths may be accompanied.

Therefore, there is a definite need for developing a wire rope diagnostic device that is capable of automatically checking the state of a wire rope and being simple in configuration so that it can be managed more efficiently and simply.

DISCLOSURE

Technical Problem

Accordingly, the present invention has been made in view of the above-mentioned problems occurring in the related art, and it is an object of the present invention to provide a wire rope diagnostic device that is capable of being modularized so that two structures are supported against battery packs attached to both sides thereof, thereby performing the safety diagnosis of a wire rope in a nondestructive way, being configured to allow the battery packs to be completely separated from the two structures so that the battery packs can be detachably attached to the two structures even when they are exchanged with new ones, and being configured to allow the two structures to be fastened to each other under the support of the battery packs so that installation conveniences and sensing performance can be optimized.

The technical problems to be achieved through the present invention are not limited as mentioned above, and other technical problems not mentioned herein will be obviously understood by one of ordinary skill in the art through the following description.

Technical Solution

To accomplish the above-mentioned objects, according to the present invention, there is provided a wire rope diagnostic device including: a body having a through hole formed in the center thereof to pass a wire rope through the through hole; battery packs fastened to both sides of the body to fix the body thereto and transfer electric power to the body; and a sensor located inside the body and having a shape of a cylinder pierced with a hole in the center to pass the wire rope through the hole and measure magnetic flux leakage.

The body may include: a first holder body; a second holder body; fastening portions for fitting fixing screws thereto to fasten the first holder body and the second holder body to the battery packs; and a first mounting base and a second mounting base located on the undersides of the first holder body and the second holder body to fixedly support the first holder body, the second holder body, and the battery packs against.

The first holder body and the second holder body may include: a first upper cover and a second upper cover disposed on both outer surfaces of the body; and a first lower cover and a second lower cover coupled to the first upper cover and the second upper cover by means of the battery packs.

The body may further include: a main printed circuit board (PCB) substrate; a sub PCB substrate; and sealing rubber fitted to a gap between the first lower cover and the main PCB substrate and to a gap between the second lower cover and the sub PCB substrate, respectively.

The body may further include protrusion-shaped battery terminals formed thereon in directions fastened to the battery packs so as to electrically connect electrode terminals of battery cells of the battery packs thereto and the battery packs come into contact with the battery terminals and are electrically connected to the battery terminals.

Each battery pack may include the battery cells disposed therein, each battery cell having the shape of a cylinder made of a steel material.

The sensor may include: a magnet part for forming a main magnetic flux path in which a setting section in an axial direction of the wire rope is included; a hall sensor part for detecting magnetic flux leakage generated from a damaged portion of the wire rope if the wire rope is magnetized by the magnet part; and one or more yokes for fixing the magnet part and the hall sensor part thereto.

The magnet part may include: a first magnet part having a plurality of magnets arranged in series on one side of the inner peripheral surfaces of one or more yokes in a circumferential direction of the wire rope; and a second magnet part having a plurality of magnets arranged in series on the other side of the inner peripheral surfaces of one or more yokes in the circumferential direction of the wire rope.

The hall sensor part may include a plurality of hall sensors located between the first magnet part and the second magnet part to detect the magnetic flux leakage generated from the wire rope.

One or more yokes may include a first yoke and a second yoke each having a sectional shape of U adapted to allow the magnet part to surround ½ of the circumference of the wire rope, while having no contact with the wire rope and placing the setting section from the wire rope, so that the magnet part and the hall sensor part are arranged to the shapes of cylinders in parallel with a transverse direction of the wire rope.

One or more yokes may include even number of straight yokes adapted to allow the magnet part to surround the circumference of the wire rope in an axial direction thereof, while having no contact with the wire rope and placing the setting section from the wire rope, so that the magnet part and the hall sensor part are arranged to the shapes of cylinders in parallel with the transverse direction of the wire rope.

The sensor may further include flexible printed circuit boards (FPCBs) disposed between the hall sensor part and one or more yokes.

Advantageous Effects

According to the present invention, the wire rope diagnostic device is modularized so that two structures are supported against the battery packs attached to both sides thereof, thereby performing the safety diagnosis of the wire rope in a nondestructive way, configured to allow the battery packs to be completely separated from the two structures so that the battery packs can be detachably attached to the two structures even when they are exchanged with new ones, and configured to allow the two structures to be fastened to each other under the support of the battery packs so that installation conveniences and sensing performance can be optimized.

The effectiveness of the invention is not limited as mentioned above, and it should be understood to those skilled in the art that the effectiveness of the invention may include another effectiveness as not mentioned above from the detailed description of the present invention.

BRIEF DESCRIPTION OF DRAWINGS

FIG. 1 is a perspective view showing a wire rope diagnostic device according to the present invention.

FIG. 2 is an exploded perspective view showing a state where battery packs are separated from the wire rope diagnostic device according to the present invention.

FIG. 3 is an exploded perspective view showing the battery packs of the wire rope diagnostic device according to the present invention.

FIG. 4 is a perspective view showing a state where battery cells are mounted on a body of the wire rope diagnostic device according to the present invention.

FIG. 5 is a plan view showing the wire rope diagnostic device according to the present invention.

FIG. 6 is a perspective view showing the body of the wire rope diagnostic device according to the present invention.

FIG. 7 is a bottom perspective view showing the body of the wire rope diagnostic device according to the present invention.

FIG. 8 is an exploded perspective view showing the body of the wire rope diagnostic device according to the present invention.

FIG. 9 is a perspective view showing a portion of a sensor of the wire rope diagnostic device according to the present invention.

FIG. 10 is a perspective view showing the sensor of the wire rope diagnostic device according to the present invention.

FIG. 11 is a plan view showing the sensor of the wire rope diagnostic device according to the present invention.

FIG. 12 is a perspective view showing another example of the sensor of the wire rope diagnostic device according to the present invention.

MODE FOR INVENTION

Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure.

Terms, such as the first, the second, and the like, may be used to describe various elements, but the elements should not be restricted by the terms. The terms are used to only distinguish one element from the other element.

When it is said that one element is described as being "connected" or "coupled" to the other element, one element may be directly connected or coupled to the other element, but it should be understood that another element may be present between the two elements. In the description, when it is said that one portion is described as "includes" any component, one element further may include other components unless no specific description is suggested.

Hereinafter, an explanation of the present invention will be given in detail with reference to the attached drawings.

FIG. 1 is a perspective view showing a wire rope diagnostic device according to the present invention.

Referring to FIG. 1, a wire rope diagnostic device 1000 according to the present invention includes a body 1100 having a through hole formed in the center thereof to pass a wire rope through the through hole, battery packs 1210 and 1220 fastened to both sides of the body 1100 to fix the body 1100 thereto and transfer electric power to the body 1100, and a sensor 1300 (not shown) located inside the body 1100 and having a shape of a cylinder pierced with a hole in the center to pass the wire rope through the hole and measure magnetic flux leakage, wherein the battery packs 1210 and 1220 are fitted to both sides of the body 1100, and after fastening portions 1130 of the body 1100 are aligned to screw holes of the battery packs 1210 and 1220, the fastening portions 1130 and the screw holes are fastened to each other by means of fixing screws to thus fix the body 1100 and the battery packs 1210 and 1220 to each other.

FIG. 2 is an exploded perspective view showing a state where battery packs are separated from the wire rope diagnostic device according to the present invention.

Referring to FIG. 2, if the body 1100 is provided by fastening an assembly of a first holder body 1110 and a first mounting base 1140 and an assembly of a second holder body 1120 and a second mounting base 1150 to each other to thus pass the wire rope through the center thereof in upward and downward directions in the figure, the first battery pack 1210 and the second battery pack 1220 are fixedly fastened to the left and right sides of the body 1100 located on the center in left and right directions in the figure.

If the fixing screws are removed from the body 1100 to separate the first battery pack 1210 and the second battery pack 1220 from the body 1100, further, it can be checked that the sensor 1300 is built inside the body 1100.

FIG. 3 is an exploded perspective view showing the battery packs of the wire rope diagnostic device according to the present invention.

Referring to FIG. 3, the wire rope diagnostic device 1000 according to the present invention is configured to allow the first battery pack 1210 and the second battery pack 1220 to be mounted on both sides of the body 1100.

In specific, the first battery pack 1210 includes a first battery outer cover 1211, a first battery inner cover 1213 facingly fastened to the first battery outer cover 1211, and a first battery cell 1212 built in a space between the first battery outer cover 1211 and the first battery inner cover 1213.

The first battery cell 1212 includes a plurality of cylindrical cells made of a steel material and connected to one another.

In the same manner as the first battery pack 1210, the second battery pack 1220 includes a second battery outer cover 1221, a second battery inner cover 1223 facingly fastened to the second battery outer cover 1221, and a second battery cell 1222 built in a space between the second battery outer cover 1221 and the second battery inner cover 1223.

The second battery cell 1222 includes a plurality of cylindrical cells made of a steel material and connected to one another.

FIG. 4 is a perspective view showing a state where the battery cells are mounted on the body of the wire rope diagnostic device according to the present invention.

Referring to FIG. 4, portions of the body 1100 coming into contact with the first and second battery cells 1212 and 1222 in a state where the first and second battery packs 1210 and 1220 are mounted onto the body 1100 will be explained now. In specific, the body 1100 has battery terminals 1160 coming into contact with the first and second battery cells 1212 and 1222 of the first and second battery packs 1210 and 1220.

In this case, the battery terminals 1160 have the shapes of protrusions protruding from the upper portions of the surfaces of the body 1100 on which the first and second battery packs 1210 and 1220 are mounted to thus connect the electrode terminals of the first and second battery cells 1212 and 1222 of the first and second battery packs 1210 and 1220 thereto.

The electric power supplied from the first and second battery cells 1212 and 1222 is transferred to a main printed circuit board (PCB) substrate 1114, a sub PCB substrate 1124, flexible printed circuit boards (FPCBs) 1340, and the sensor 1300 through the battery terminals 1160.

FIG. 5 is a plan view showing the wire rope diagnostic device according to the present invention.

Referring to FIG. 5, when tops of the battery terminals 1160 are viewed in the state where the first and second battery packs 1210 and 1220 are mounted onto the body 1100 of the wire rope diagnostic device 1000 according to the present invention, the cylindrical through hole is formed on the center of the body 1100, and the first and second battery cells 1212 and 1222 of the first and second battery packs 1210 and 1220 are mounted onto the battery terminals 1160 of the body 1100, so that as the wire rope passes through the through hole of the body 1100, the magnetic flux leakage of the wire rope is measured.

FIG. 6 is a perspective view showing the body of the wire rope diagnostic device according to the present invention.

Referring to FIG. 6, the body 1100 of the wire rope diagnostic device 1000 according to the present invention includes the first holder body 1110 and the second holder body 1120 for supporting the sensor 1300.

Further, the body 1100 includes the fastening portions 1130 for fastening the first battery pack 1210 and the second battery pack 1220 thereto and the first mounting base 1140 and the second mounting base 1140 for supporting the underside thereof.

In specific, the first holder body 1110 and the first mounting base 1140 are fastened to each other in upward and downward directions, and the second holder body 1120 and the second mounting base 1150 are fastened to each other in upward and downward directions. Next, the assembly of the first holder body 1110 and the first mounting base 1140 and the assembly of the second holder body 1120 and the second mounting base 1150 are coupled to each other to pass the wire rope through the through hole of the body 1100, and if the first battery pack 1210 and the second battery pack 1220 are located on both sides of the body 1100, the fixing screws are fitted to the fastening portions 1130 to fix the respective parts of the wire rope diagnostic device 1000 to one another.

FIG. 7 is a bottom perspective view showing the body of the wire rope diagnostic device according to the present invention.

Referring to FIG. 7, fixing screws are fixed to the undersides of the first mounting base 1140 and the second mounting base 1150 to fix the first holder body 1110 and the second holder body 1120 to the first mounting base 1140 and the second mounting base 1150.

In this case, a rubber material may be attached to the undersides of the first mounting base 1140 and the second mounting base 1150, respectively, to reduce frictions occurring from the undersides of the first mounting base 1140 and the second mounting base 1150.

FIG. 8 is an exploded perspective view showing the body of the wire rope diagnostic device according to the present invention.

Referring to FIG. 8, the body 1100 of the wire rope diagnostic device 1000 according to the present invention includes the sensor 1300 located on the center thereof and the first holder body 1110 and the second holder body 1120 located on both sides of the sensor 1300.

In specific, the first holder body 1110 includes a first upper cover 1111, the main PCB 1114, first sealing rubber 1113, and a first lower cover 1112 arranged in the order mentioned in the direction of the sensor 1300 from the outside of the body 1100. Accordingly, one side of the first holder body 1110 is fixedly fastened to the first battery pack 1210 by means of the fixing screws, and the other side to the second battery pack 1220 by means of the fixing screws.

In the same manner as the first holder body 1110, the second holder body 1120 includes a second upper cover 1121, the sub PCB 1124, second sealing rubber 1123, and a second lower cover 1122 arranged in the order mentioned in the direction of the sensor 1300 from the outside of the body 1100. Accordingly, one side of the second holder body 1120 is fixedly fastened to the first battery pack 1210 by means of the fixing screws, and the other side to the second battery pack 1220 by means of the fixing screws.

Further, the first mounting base 1140 and the second mounting base 1150 are attached to the undersides of the first holder body 1110 and the second holder body 1120.

In this case, the first sealing rubber 1113 and the second sealing rubber 1123 are provided along the edges of the first upper cover 1111 and the first lower cover 1112 and the edges of the second upper cover 1121 and the second lower cover 1122, respectively, thereby fixedly sealing the interiors of the first holder body 1110 and the second holder body 1120.

FIG. 9 is a perspective view showing a portion of a sensor of the wire rope diagnostic device according to the present invention.

Referring to FIG. 9, the sensor 1300 of the wire rope diagnostic device 1000 according to the present invention includes a magnet part 1310 for forming a main magnetic flux path in which a setting section in an axial direction of the wire rope is included, a hall sensor part 1320 for detecting magnetic flux leakage generated from a damaged portion of the wire rope if the wire rope is magnetized by the magnet part 1310, one or more yokes 1330 (not shown) for fixing the magnet part 1310 and the hall sensor part 1320 thereto, and the flexible printed circuit boards (FPCB) 1340 disposed between the hall sensor part 1320 and one or more yokes 1330.

The magnet part 1320 includes a first magnet part 1311 having a plurality of magnets arranged in series on one side of the inner peripheral surfaces of one or more yokes 1330 in a circumferential direction of the wire rope and a second magnet part 1312 having a plurality of magnets arranged in series on the other side of the inner peripheral surfaces of one or more yokes 1330 in a circumferential direction of the wire rope.

In this case, the first magnet part 1311 includes one or more magnets attached to the circular holes formed in series on the top right of the yokes 1330, and the second magnet part 1312 includes one or more magnets attached to the circular holes formed in series on the bottom left of the yokes 1330.

The first magnet part 1311 and the second magnet part 1312 attached to the yokes 1330 generate a magnetic field to thus form the main magnetic flux path in which the setting section between the first magnet part 1311 and the second magnet part 1312 is included in the axial direction of the wire rope so that the magnetic flux leakage of the wire rope can be measured by the hall sensor part 1320.

In this case, the hall sensor part 1320 serves to detect the magnetic flux leakage of the wire rope on the main magnetic flux path if the wire rope is magnetized by the magnet part 1310 having the first magnet part 1311 and the second magnet part 1312.

If a damaged portion such as disconnection, diameter reduction, wear, kink, bending, and the like is generated on the wire rope, the hall sensor part 1320 detects the magnetic flux leakage generated from the damaged portion of the wire rope.

The detected signal of the hall sensor part 1320 is analyzed in real time to learn the waveform of magnetic flux leakage data, and accordingly, it is determined that what kind of defect is generated from the damaged portion of the wire rope, thereby producing a safety diagnosis result for the wire rope.

In the process of producing the safety diagnosis result, the defect of the wire rope is determined using deep learning, and the produced safety diagnosis result is transmitted to a user terminal in real time.

Accordingly, the safety diagnosis result of the wire rope can be checked in real time by a user, thereby preventing the occurrence of safety accidents.

As shown in FIG. 9, one or more yokes 1330 include a first yoke 1331 and a second yoke 1332 (not shown) having the same shape as the first yoke 1332, each yoke having a sectional shape of U adapted to allow the magnet part 1310 to surround ½ of the circumference of the wire rope, while having no contact with the wire rope and placing the setting section from the wire rope, so that the magnet part 1310 and the hall sensor part 1320 are arranged to the shapes of cylinders in parallel with the transverse direction of the wire rope.

In this case, the plurality of magnets are arranged in series on the first magnet part 1311 and the second magnet part 1312 of the first yoke 1331 and the second yoke 1332, respectively, and a plurality of hall sensors are arranged in series on the hall sensor part 1320.

FIG. 10 is a perspective view showing the sensor of the wire rope diagnostic device according to the present invention, and FIG. 11 is a plan view showing the sensor of the wire rope diagnostic device according to the present invention.

Referring to FIG. 10, the second yoke 1332 having the same shape as the first yoke 1331 faces the U-shaped inner peripheral wall of the first yoke 1331, and accordingly, the sensor 1300 is located inside the body 1100 to surround the wire rope passing through the through hole formed at the center thereof.

When the sensor 1300 of FIG. 10 is viewed on top thereof, the sensor 1300 as shown in FIG. 11 is provided. Referring to FIG. 11, the sensor 1300 includes the yokes 1330 located on the outer surface thereof and the FPCBs 1340 located on the inner peripheral wall thereof.

FIG. 12 is a perspective view showing another example of the sensor of the wire rope diagnostic device according to the present invention.

As shown in FIG. 12, one or more yokes 1330 include even number of straight yokes 1333 adapted to allow the magnet part 1310 to surround the circumference of the wire rope in the axial direction of the wire rope, while having no contact with the wire rope and placing the setting section from the wire rope, so that the magnet part 1310 and the hall sensor part 1320 are arranged to the shapes of cylinders in parallel with the transverse direction of the wire rope.

In this case, one magnet of the first magnet part 1311, one magnet of the second magnet part 1312, and a plurality of hall sensors of the hall sensor part 1320 are arranged on each straight yoke 1333, so that the straight yokes 1333 surround the through hole and thus face the center of the wire rope.

The sensor 1300 having the yokes 1330 is configured to allow the yokes 1330 to be coupled to the shape of the cylinder inside the body 1000 to provide the through hole formed on the center thereof, so that the wire rope passes through the through hole.

The magnets of the magnet part 1310 and the first yoke 1331 and the second yoke 1332 or the plurality of straight yokes 1333 of the yokes 1330 may be freely changed into other shapes.

The wire rope diagnostic device 1000 according to the present invention may be varied in configuration, but it operates under a main principle in which the magnetic flux generated from the magnets of the first magnet part 1311 and the second magnet part 1312 attached to the yokes 1330 is measured by the hall sensors located between the first magnet part 1311 and the second magnet part 1312 and the waveform of the magnetic flux leakage data is thus analyzed to produce the safety diagnosis result of the wire rope.

In this case, the hall sensor part 1320 includes the plurality of hall sensors located between the first magnet part 1311 and the second magnet part 1312 (for example, at a center therebetween) to detect the magnetic flux leakage generated from the wire rope, and the FPCBs 1340 are disposed between the plurality of hall sensors and one or more yokes 1330.

The wire rope diagnostic device 1000 according to the present invention is configured to allow the first holder body 1110, the second holder body 1120, the first mounting base 1140, and the second mounting base 1150 to be coupled to one another through the first battery pack 1210 and the second battery pack 1220 and to provide the sensor 1300 as a nondestructive sensor mounted in the circumferential direction of the wire rope, without any destruction of the wire rope, so that the magnetic flux path generated from the magnet part 1310 of the sensor 1300 is measured to produce the safety diagnosis result from the changes in the magnetic flux leakage and the produced diagnosis result is transmitted to the user terminal in real time.

In this case, desirably, the user terminal includes a cellular phone, a smart phone, a tablet computer, a laptop computer, a personal computer, a digital broadcasting terminal, a personal digital assistance (PDA), a portable multimedia player (PMP), and the like.

Further, desirably, the wire rope diagnostic device 1000 and the user terminal adopt near field communication such as Bluetooth, radio frequency identification (RFID), infrared data association, ultra wideband (UWB), ZigBee, wireless LAN (WLAN), Wi-Fi, and the like.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

The invention claimed is:

1. A wire rope diagnostic device comprising:
a body having a through hole formed in the center thereof to pass a wire rope through the through hole;
battery packs fastened to both sides of the body to fix the body thereto and transfer electric power to the body; and
a sensor located inside the body and having a shape of a cylinder pierced with a hole in the center to pass the wire rope through the hole and measure magnetic flux leakage,
wherein the body comprises:
a first holder body;
a second holder body;
fastening portions for fitting fixing screws thereto to fasten the first holder body and the second holder body to the battery packs; and
a first mounting base and a second mounting base located on the undersides of the first holder body and the second holder body to fixedly support the first holder body, the second holder body, and the battery packs against.

2. The wire rope diagnostic device according to claim 1, wherein the first holder body and the second holder body comprise:
a first upper cover and a second upper cover disposed on both outer surfaces of the body; and
a first lower cover and a second lower cover coupled to the first upper cover and the second upper cover by means of the battery packs.

3. The wire rope diagnostic device according to claim 2, wherein the body further comprises:
a main printed circuit board (PCB) substrate;
a sub PCB substrate; and
sealing rubber fitted to a gap between the first lower cover and the main PCB substrate and to a gap between the second lower cover and the sub PCB substrate, respectively.

4. The wire rope diagnostic device according to claim 1, wherein the body further comprises protrusion-shaped battery terminals formed thereon in directions fastened to the battery packs so as to electrically connect electrode terminals of battery cells of the battery packs thereto and the battery packs come into contact with the battery terminals and are electrically connected to the battery terminals.

5. The wire rope diagnostic device according to claim 1, wherein each battery pack comprises the battery cells disposed therein, each battery cell having the shape of a cylinder made of a steel material.

6. The wire rope diagnostic device according to claim 1, wherein the sensor comprises:
a magnet part for forming a main magnetic flux path in which a setting section in an axial direction of the wire rope is included;
a hall sensor part for detecting magnetic flux leakage generated from a damaged portion of the wire rope if the wire rope is magnetized by the magnet part; and
one or more yokes for fixing the magnet part and the hall sensor part thereto.

7. The wire rope diagnostic device according to claim 6, wherein the magnet part comprises:
a first magnet part having a plurality of magnets arranged in series on one side of the inner peripheral surfaces of one or more yokes in a circumferential direction of the wire rope; and
a second magnet part having a plurality of magnets arranged in series on the other side of the inner peripheral surfaces of one or more yokes in the circumferential direction of the wire rope.

8. The wire rope diagnostic device according to claim 7, wherein the hall sensor part comprises a plurality of hall sensors located between the first magnet part and the second magnet part to detect the magnetic flux leakage generated from the wire rope.

9. The wire rope diagnostic device according to claim 6, wherein one or more yokes comprise a first yoke and a second yoke each having a sectional shape of U adapted to allow the magnet part to surround ½ of the circumference of the wire rope, while having no contact with the wire rope and placing the setting section from the wire rope, so that the magnet part and the hall sensor part are arranged to the shapes of cylinders in parallel with a transverse direction of the wire rope.

10. The wire rope diagnostic device according to claim 6, wherein one or more yokes comprise even number of straight yokes adapted to allow the magnet part to surround the circumference of the wire rope in an axial direction thereof, while having no contact with the wire rope and placing the setting section from the wire rope, so that the magnet part and the hall sensor part are arranged to the shapes of cylinders in parallel with the transverse direction of the wire rope.

11. The wire rope diagnostic device according to claim 6, wherein the sensor further comprises flexible printed circuit boards (FPCBs) disposed between the hall sensor part and one or more yokes.

* * * * *